United States Patent [19]
Milton et al.

[11] Patent Number: 5,631,949
[45] Date of Patent: May 20, 1997

[54] LOCATION INDEPENDENT TIME REPORTING MESSAGE RETRIEVAL SYSTEM

[75] Inventors: Stephen M. Milton, Freehold; Gang Yang, Holmdel, both of N.J.

[73] Assignee: Lucent Technologies Inc., Murray Hill, N.J.

[21] Appl. No.: 445,486

[22] Filed: May 22, 1995

[51] Int. Cl.⁶ ................................................. H04M 1/64
[52] U.S. Cl. ........................... 379/67; 379/142; 379/201; 379/245
[58] Field of Search ................... 379/67, 88, 89, 379/142, 201, 242, 245

[56] References Cited

U.S. PATENT DOCUMENTS 4,625,081  11/1986  Lotito et al. .............................. 379/67
5,539,809   7/1996  Mayer et al. ............................. 379/67

*Primary Examiner*—Fan Tsang

[57] ABSTRACT

When a subscriber to message retrieval service retrieves a message, rather than reporting a time of day associated with the message that may not have any meaning to the subscriber if the subscriber, the message originator and the message depository are in diverse worldwide locations, the disclosed message retrieval system reports a delta time indicating to the retrieving subscriber the time elapsed since the message originator delivered the message.

11 Claims, 3 Drawing Sheets

31

41

LOCATION INDEPENDENT TIME REPORTING MESSAGE RETRIEVAL SYSTEM

TECHNICAL FIELD

This invention relates to message retrieval systems, and more particularly, to a message retrieval system which reports an associated time with each message retrieved by the subscriber from his mailbox.

BACKGROUND OF THE INVENTION

Message retrieval systems are well known in the art. Generally, in such systems, subscribers are provided with a voice mailbox into which non-subscribers or other subscribers can deliver voice messages for the mailbox subscriber, which can be retrieved by that subscriber at his or her convenience at any later time. Such message retrieval systems are expanding world-wide, allowing both messages to be originated and retrieved from any place in the world having access to a telephone. A useful piece of information usually provided to the subscriber with each retrieved voice message is the time at which the message was inputed into the system by the originator. This information may be critical to the subscriber to determine what action and when that action needs to be taken after listening to the message.

In smaller, more localized message retrieval systems, the message repository, the subscriber, and the message originator are likely to be located in the same time zone or separated by at most one or two time zones. Thus, the time reported to the subscriber for a retrieved message that is based on the time standard at the message repository, or the time standard of the subscriber's home location, or some other time standard, such as Eastern Standard Time (EST), may be sufficiently informative to the subscriber. In a world-wide system, however, in which messages could be both originated and retrieved from different ones of the twenty-four possible time zones, and in which the message repository could exist anywhere, associating a time with each message that has real meaning to the subscriber is difficult. Since automatic number identification (ANI) information that provides the calling party's number, and from that an identifiable location, is not always available from either the originator when the message is left or from the subscriber when retrieving the message, the system would be unable to associate a time with the message other than the local time at the message repository or a time based on an assumed location of the subscriber.

SUMMARY OF THE INVENTION

The present invention eliminates the aforedescribed problems by associating and reporting with each message retrieved by the subscriber, not an actual time, but the elapsed time, delta time, between the absolute time at which the subscriber retrieves the message as referenced to a predetermined time standard, such as Greenwich Mean Time (GMT), and the absolute time at which the message was delivered by the message originator to the message repository as referenced to that same predetermined time standard. Thus, when being informed of that elapsed time, the subscriber can better determine his course of action. If automatic number identification (ANI) information can be detected from the message originator's call, then the current time in the time zone associated with the identified area code or the time in that time zone at which the message was left may also be provided to the subscriber together with the delta time. Furthermore, if the delta time exceeds a predetermined time interval, such as twenty-four hours, rather than reporting the elapsed time, the system can report the actual month and day on which the message originator delivered the message.

DETAILED DESCRIPTION

Figure 1:
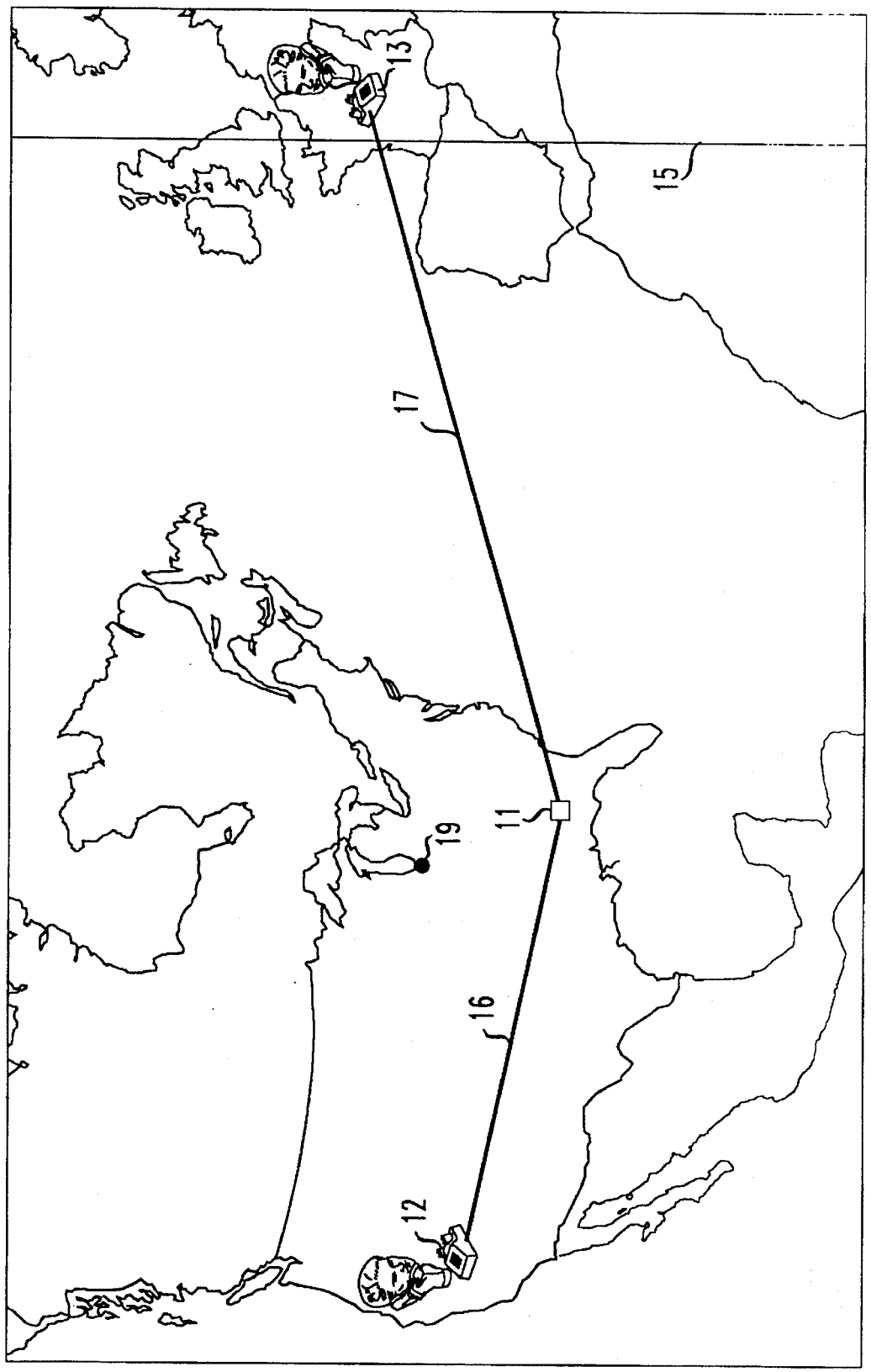
FIG. 1 is a partial world map showing diverse global locations of a message originator, a subscriber, and a message repository.

With reference to FIG. 1, a world-wide message retrieval system is shown in which a message repository 11 is located in the south-eastern portion of the United States in the Eastern Standard Time (EST) Zone, which is five hours behind Greenwich Mean Time (GMT), which is determined at the prime meridian 15 that passes through Greenwich, England. A message originator 12 is located in the western United States in the Pacific Standard Time (PST) Zone, which is eight hours behind GMT, and a subscriber 13, who resides in Chicago, 19, in the Central Standard Time (CST) Zone, which is six hours behind GMT, is traveling on business in France, which is one hour ahead of GMT. The subscriber 13 accesses his voice mailbox over the telephone network from France to retrieve and then respond to the messages left in his voice mailbox.

The message retrieval 11 system operates in a standard manner, well known in the art. The message originator 12 accesses the system by dialing an 800 number on the the telephone network 16, which connects him to the message repository 11. By following a set of instructions, the originator can leave a message for a designated subscriber in the subscriber's mailbox for later retrieval. The subscriber when later accessing the message repository 11 over the telephone network 17 from France and identifying himself to the system by means of a touch-tone inputed identification code, retrieves this and all other messages left in his voice mailbox.

Figure 2:
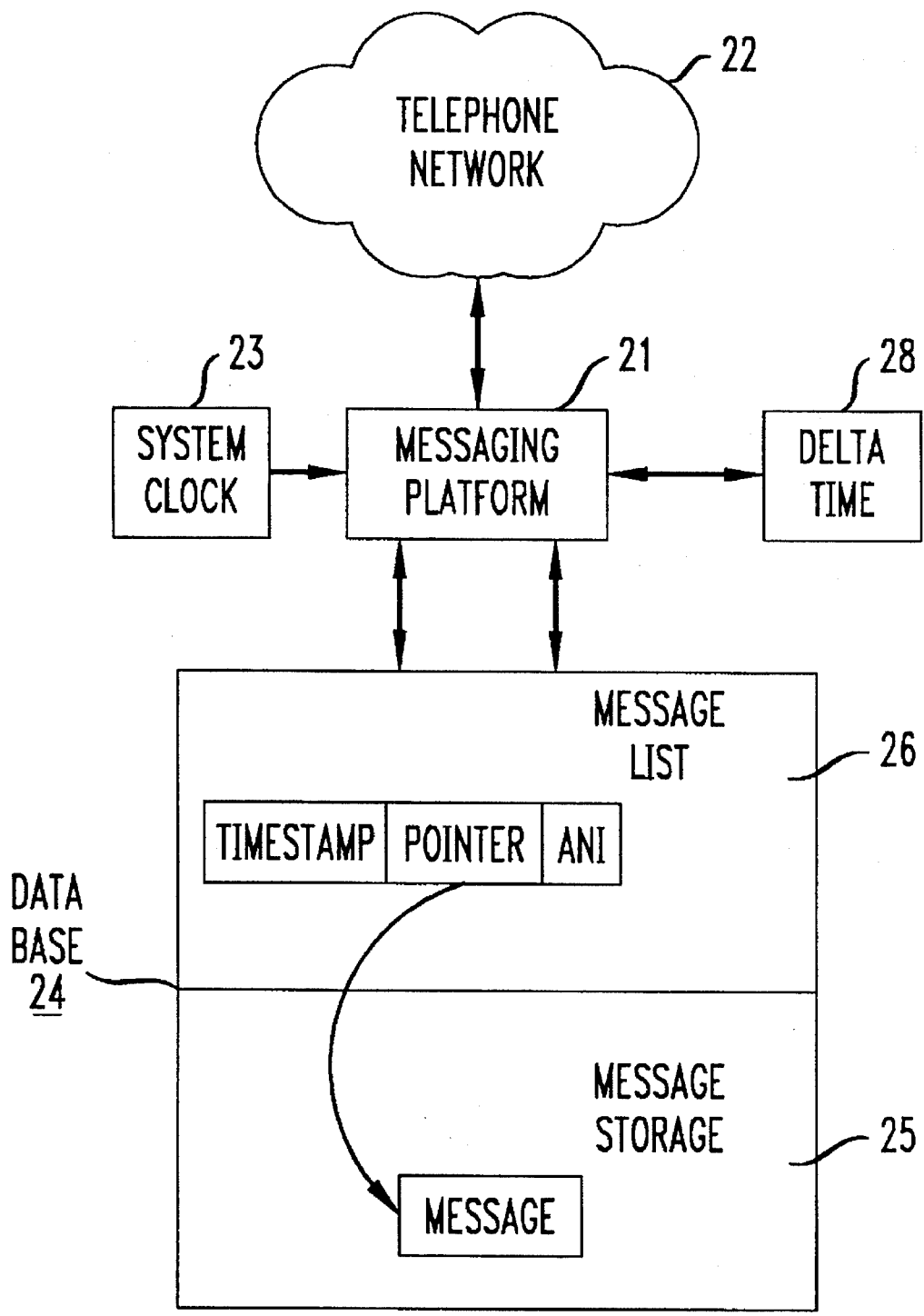
FIG. 2 is a block diagram of the message repository showing a data base including a messaging platform and a message storage database.

The message repository 11, shown in block diagram in FIG. 2, includes a messaging platform 21, connected to the POTS telephone network 22, a system clock 23, and a database 24. The messaging platform 21 receives calls from the telephone network 22 from a message originator; validates access to the system by the message originator for delivery of messages to a subscriber's mailbox; and converts the incoming message to digital format for storage in the database 24. Similarly, the messaging platform 21 receives calls from the telephone network 22 from a subscriber; validates access to the system by the subscriber by means of a touch-tone inputed subscriber identification and password; and retrieves selected messages from the system's digital memory and converts the stored digital messages to analog format for playback to the subscriber.

The database 24 includes an area of memory 25 allocated for storing the digitally converted messages for each subscriber and a message list memory area 26. The message list memory area 26 stores message header information for each message in each subscriber's voice mailbox. As shown in FIG. 2, the message header for each message includes an associated timestamp derived from the system clock 23, a pointer pointing to the address in the memory area 25 in which the message is actually stored, and, if available, the detected ANI associated with that message's originator.

As previously discussed, the value of the time associated and reported with each message retrieved by the subscriber will be diminished without the benefit of the present invention. For example, if message originator 12 leaves a voice message at 9:15 AM PST, and subscriber 13 accesses the message retrieval system at 8:15 PM, in local French time, the system, might report to the subscriber that the message was received at 12:15 PM EST, the local time at which message repository received and stored the message. Alternatively, by identifying the subscriber with his Chicago home CST zone, the system might report that the message was received at 11:15 AM. In order to avoid these problems, the messaging platform 21 stores in the message list a timestamp for each message that is an absolute time derived from a system clock 23, which is based on a predetermined time standard. When the subscriber later accesses this message, the then current time in that same predetermined time standard is determined by the messaging platform 21 from system clock 23, and the elapsed time between events, delta time, is calculated based on the difference between the then value of the system clock 23 and the stored timestamp associated with the retrieved message. That delta time is then converted by the messaging platform 21 to an analog voice signal and transmitted to the subscriber together with the decoded message.

Figure 3:
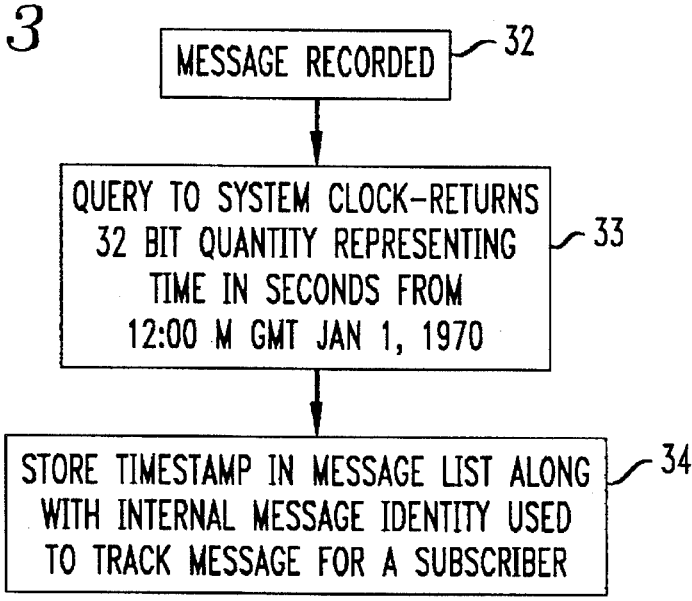
FIG. 3 is a flow chart showing the recording module employed in the messaging platform used for recording a message and an associated timestamp with each received message.

With reference to FIG. 3, a flowchart 31 for the recording module included within the messaging platform 21 of the message retrieval system is shown. At step 32, the message originator, such as 12 in FIG. 1, records the message to be delivered to the designated and identified subscriber, such as 13 in FIG. 1. After the message originator records the message, the system clock 23 is queried at step 33, which returns a 32-bit quantity representing the time in seconds from a standard worldwide reference time of 12:00 Midnight GMT, Jan. 1, 1970. At step 34 that 32-bit quantity, the timestamp for the message, is stored in the message list together with the message pointer that points to the locations of the stored message in the message storage memory area 25.

Figure 4:
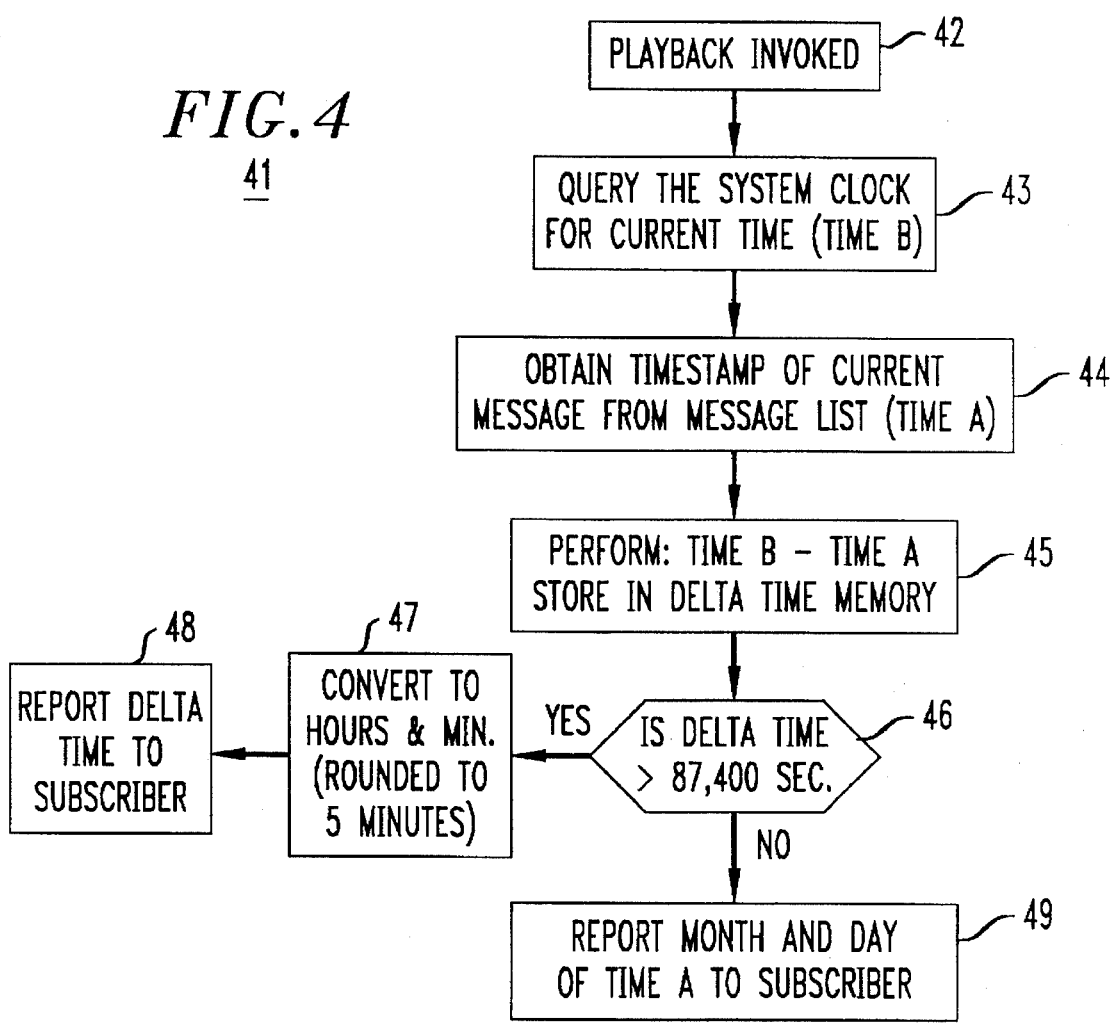
FIG. 4 is a flow chart showing the retrieval module employed in the messaging platform used for accessing a message for playback to the subscriber together with its associated delta time for that message.

When the subscriber 13 later accesses the system to retrieve his messages, a retrieve module of the messaging platform 21 is activated. A flowchart 41 of this retrieve module is shown in FIG. 4. At step 42 message playback is invoked to retrieve, decode and convert into a voice signal a selected message stored in the message storage memory area 25. After decoding and outputting of that message, the system clock 23 is queried at step 43 for the current time (time B), which is also returned to the messaging platform as a 32-bit quantity representing the time in seconds from 12:00 Midnight GMT Jan. 1, 1970. At step 44, the 32-bit timestamp of the just retrieved message is obtained from the message list (time A). The digital difference between time B and time A is then calculated at step 45, and the resultant time difference, delta time, is stored in a delta time memory 28 associated with the messaging platform. If the decimal equivalent of delta time is less than the number of seconds in one day (87,400), then delta time is converted into hours and minutes and the subscriber is provided with the amount of time, in hours and minutes, that has elapsed since the message originator inputed the message to the system. Thus at decision box 46, the decimal equivalent of delta time is compared with 87,400 (the number of seconds in a day). If delta time is less than 87,400, it is converted at step 47 to "x" hours and "y" minutes, where "y" has been rounded to the nearest 5-minute interval. The converted delta time is then decoded and transformed into an analog voice signal and reported to the subscriber at step 48 with a voice message indicating the month and day. If, at decision box 46, the calculated delta time is greater than 87,400, then time A is converted into a month and a day and reported to the subscriber at step 49 with a voice message indicating that month and day.

In order to provide the elapsed time information with each retrieved message, the ANI associated with the message originator is not required. If however, the ANI is available, the system may have the option to provide additional information to the retrieving subscriber. Thus, in addition to providing the subscriber with the elapsed time information, the software in the messaging platform can further determine the message originator's local time zone. The then current time accessed from the system clock, time B, can be converted into the current time in the message originator's time zone, which can then also be provided to the subscriber with the elapsed time.

Although described hereinabove in connection with the retrieval by a subscriber of a message at an earlier delivery of the message by a message originator to the system, where upon retrieval the subscriber is provided with the elapsed between the delivering and accessing the message, the the messaging system of the present invention can also be used to specify a time a subscriber wishes to later deliver an inputed message through the system to one or more subscriber or non-subscriber message recipients. Thus, if a message is to be simultaneously delivered to multiple recipients around the globe regardless of the recipient's local time, the subscriber can specify a delta time relative to the input at which the message is to be delivered to designated recipients.

The above-described embodiment is illustrative of the principles of the present invention. Other embodiments could be devised by those skilled in the art without departing from the spirit and scope of the present invention.

The invention claimed is:

1. A message retrieval system in which a message delivered by a message originator over a telephone network for a subscriber is stored for later retrieval over the telephone network by the subscriber together with a time indicating when the message was received, the system comprising:

storage means for storing the message and an automatic number identification (ANI) information associated with the message originator when the message is delivered to the system;

a system clock producing an output representing a current time in a predetermined time standard;

means for storing a timestamp associated with the message in said storage means, said timestamp being determined from the output of the system clock at the current time the message is delivered to the system;

means for determining a delta time equal to the difference in time between the output of the system clock at a time at which the subscriber accesses the system to retrieve the stored message and the timestamp associated with the stored message;

means for converting the delta time associated with the stored message to an audio delta time signal;

means for providing the audio delta time signal to the subscriber together with the retrieved stored message; and means for determining the message originator's time zone from the ANI, means for converting the time the subscriber accesses the system to retrieve the message to a time in the message originator's time zone, and means for providing to the subscriber the converted time in the message originator's time zone together with the delta time.

2. The system of claim 1 wherein said means for determining a delta time determines delta time in hours and minutes.

3. The system of claim 2 wherein delta time is rounded to a nearest predetermined number of minutes.

4. The system of claim 1 further comprising means for comparing delta time with a time equal to a predetermined time duration.

5. The system of claim 4 wherein said means for converting the delta time converts delta time to an audio signal representing the day the message was delivered to the system by the message originator if delta time is greater than said predetermined time duration.

6. In a message retrieval system in which a message delivered by a message originator over a telephone network for a subscriber is stored for later retrieval over the telephone network by the subscriber, a method for providing the subscriber with a time together with the retrieved message that is independent of the location of the subscriber, the message originator and the location of the system, which time provides the subscriber information relating to when the message was delivered to the system by the message originator, the method comprising the steps of:

storing a timestamp associated with the message and an automatic number identification (ANI) from the message originator when the message is delivered to the system, the timestamp representing the time at which the message is delivered in a predetermined time standard;

determining the time at which the subscriber retrieves the message in the same predetermined time standard;

determining the message originator's time zone from the ANI;

calculating a delta time equal to the difference in time between the determined time at which the subscriber retrieves the message and the timestamp of the message, converting the time at which the subscriber retrieves the message to the time in the message originator's time zone; and providing the converted time in the message originator's time zone with the delta time of the message to the subscriber together with the message.

7. The method of claim 6 wherein delta time is provided to the subscriber in hours and minutes.

8. The method of claim 7 wherein the delta time provided to the subscriber is rounded to the nearest predetermined number of minutes.

9. The method of claim 6 further comprising the steps of:

comparing delta time with a time equal a predetermined interval of time; and providing the subscriber with the day the message was delivered instead of delta time if delta time is greater than said predetermined interval of time.

10. A message retrieval system in which a message delivered by a message originator over a telephone network for a subscriber is stored for later retrieval over the telephone network by the subscriber, the system comprising:

storage means for storing the message and an automatic number identification (ANI) information associated with the message originator when the message is delivered to the system;

means for determining the message originator's time zone from the ANI;

means for storing a timestamp associated with the message in said storage means, said timestamp indicating a delivery time of the message to the system;

means for converting the time the subscriber accesses the message for retrieval to an access time in the message originator's time zone; and means for providing to the subscriber the access time in the message originator's time zone together with a delta time equal to the difference in time between the access time and the delivery time.

11. The message retrieval system of claim 10, further comprising:

a system clock producing an output representing a current time in a predetermined time standard, wherein said timestamp being determined from the output of the system clock at the current time the message is delivered to the system;

means for converting the delta time associated with the stored message to an audio delta time signal; and means for providing the audio delta time signal to the subscriber together with the retrieved stored message.

* * * * *